United States Patent
McRae

(10) Patent No.: US 10,729,267 B2
(45) Date of Patent: Aug. 4, 2020

(54) FULL-FLOW TREE ADDITION

(71) Applicant: National Tree Company, Cranford, NJ (US)

(72) Inventor: Michael M. McRae, Ormond Beach, FL (US)

(73) Assignee: National Christmas Products LLC, Cranford, NJ (US)

(*) Notice: Subject to any disclaimer, the term of this patent is extended or adjusted under 35 U.S.C. 154(b) by 0 days.

(21) Appl. No.: 16/197,094

(22) Filed: Nov. 20, 2018

(65) Prior Publication Data

US 2020/0154924 A1   May 21, 2020

(51) Int. Cl.
*A47G 33/12*   (2006.01)
*A47G 33/06*   (2006.01)
*A47G 33/08*   (2006.01)

(52) U.S. Cl.
CPC ............. *A47G 33/12* (2013.01); *A47G 33/06* (2013.01); *A47G 33/08* (2013.01); *A47G 2033/0827* (2013.01); *A47G 2033/122* (2013.01)

(58) Field of Classification Search
CPC .... G02B 6/0005; G02B 6/0008; A47G 33/12; A47G 33/06; A47G 33/08; A47G 2033/0827; A47G 2033/122; F21W 2121/04; F21V 2200/00; F21V 2200/10; F21V 33/0028; F21V 21/00
See application file for complete search history.

(56) References Cited

U.S. PATENT DOCUMENTS

| | | | |
|---|---|---|---|
| 3,536,908 A * | 10/1970 | Oster | F21S 10/005 40/431 |
| 8,282,256 B1 * | 10/2012 | Pike | A47G 33/06 362/554 |
| 2005/0052883 A1 * | 3/2005 | Qi | A47G 33/06 362/555 |
| 2005/0185420 A1 * | 8/2005 | Kao | A47G 33/06 362/568 |
| 2017/0235127 A1 * | 8/2017 | Sprague | B29C 45/0001 362/84 |

* cited by examiner

*Primary Examiner* — Bao Q Truong
(74) *Attorney, Agent, or Firm* — Ellenoff Grossman & Schole LLP; James M. Smedley; Alex Korona

(57) ABSTRACT

Apparatus and associated methods relate to an artificial tree including a trunk with first tree branches extending from the trunk to above the floor, a base configured with apertures adapted to retain second tree branches extending from the base and covering the space between the floor and the first branches, and a light source configured to illuminate the first and second branches. In an illustrative example, the apertures may be tubes configured for fiber optics. The light source may be, for example, fiber optics illuminating branches inserted in the tubes, permitting full-flow appearance branches to spread out, covering the base. Some examples may employ additional illumination sources configured in the base below the apertures to shine through a color wheel offset from the trunk center.

20 Claims, 10 Drawing Sheets

FULL-FLOW TREE ADDITION

TECHNICAL FIELD

Various embodiments relate generally to artificial trees.

BACKGROUND

Artificial trees are trees that are not products of nature. Artificial trees are products of human construction activity. Some artificial trees may be displayed for decorative purposes. Some artificial trees may be displayed as decorations during special occasions or holidays. For example, an artificial tree constructed to have an appearance similar to a natural Christmas tree may be displayed with Christmas holiday decoration. Artificial trees may be designed to have an appearance similar to a natural tree, including, for example, a vertical central trunk, and branches extending substantially horizontally from the trunk.

Some artificial trees may be supported by a base retaining the artificial tree trunk. In various examples, an artificial tree base may include tree components such as, for example, a light source or a power supply. In an illustrative example, an artificial tree base may be visible to tree viewers. In some scenarios, an artificial tree base that is visible beneath the branches extending from the artificial tree trunk may disrupt the visual aesthetics of a decorative scene and degrade a tree viewer's experience.

In various examples, artificial trees may be illuminated. Some artificial trees may be illuminated by a light source retained in the base of the artificial tree. In various examples, an artificial tree may be illuminated by fiber optic tubes extending to the branches from a light source in the base. In some scenarios, artificial trees illuminated by fiber optic tubes may employ LED light sources. Some artificial tree LED light sources may be configured to emit multiple colors of visible light. Some artificial trees include a light source configured in the base to shine light through a color wheel including translucent sections of different colors. In various examples, an artificial tree configured with a color wheel may rotate the color wheel to change the color of the artificial tree lighting.

SUMMARY

Apparatus and associated methods relate to an artificial tree including a trunk with first tree branches extending from the top of the trunk to above the floor, a base configured with apertures adapted to retain second tree branches extending from the base and covering the space between the floor and the first branches, and a light source configured to illuminate the first and second branches. In an illustrative example, the apertures may be tubes configured for fiber optics. The light source may be, for example, fiber optics illuminating branches inserted in the tubes, permitting full-flow appearance branches to spread out, covering the base. Some examples may employ additional illumination sources configured in the base below the apertures to shine through a color wheel offset from the trunk center. Various examples may advantageously provide a brighter tree, based on added light sources illuminating more optical fibers below more color wheel area.

Various embodiments may achieve one or more advantages. For example, some embodiments may improve a user's visual enjoyment of an artificial tree. This facilitation may be a result of reducing the visibility of the tree base to an artificial tree user. In some embodiments, the visual appeal of an artificial tree may be improved. Such improved artificial tree visual appeal may be a result of spreading out branches to cover the base and covering the space from the tree branches down close to the floor. Some embodiments may increase the brightness of an artificial tree's illumination. Such increased illuminated artificial tree brightness may be a result of additional illumination sources positioned below an artificial tree's color wheel.

In an illustrative example, various embodiments may include additional illumination sources configured to shine through previously unused areas of an artificial tree's color wheel. This facilitation may be a result of added fiber optic tube openings configured in the base, permitting additional light sources to be positioned below the added fiber optic tube openings in the base. Some embodiments may provide a more stable artificial tree. Such improved artificial tree stability may be a result of supports that hold the additional fiber optics and additional branches in the openings configured in the base. In some embodiments, an artificial tree's weight may be more evenly distributed. Such improved artificial tree weight distribution may be a result of supporting additional branches and optical fibers in the base to prevent the added off-center load from pulling the optical fibers out of the openings included in the base.

The details of various embodiments are set forth in the accompanying drawings and the description below. Other features and advantages will be apparent from the description and drawings, and from the claims.

DETAILED DESCRIPTION OF ILLUSTRATIVE EMBODIMENTS

Figure 8:
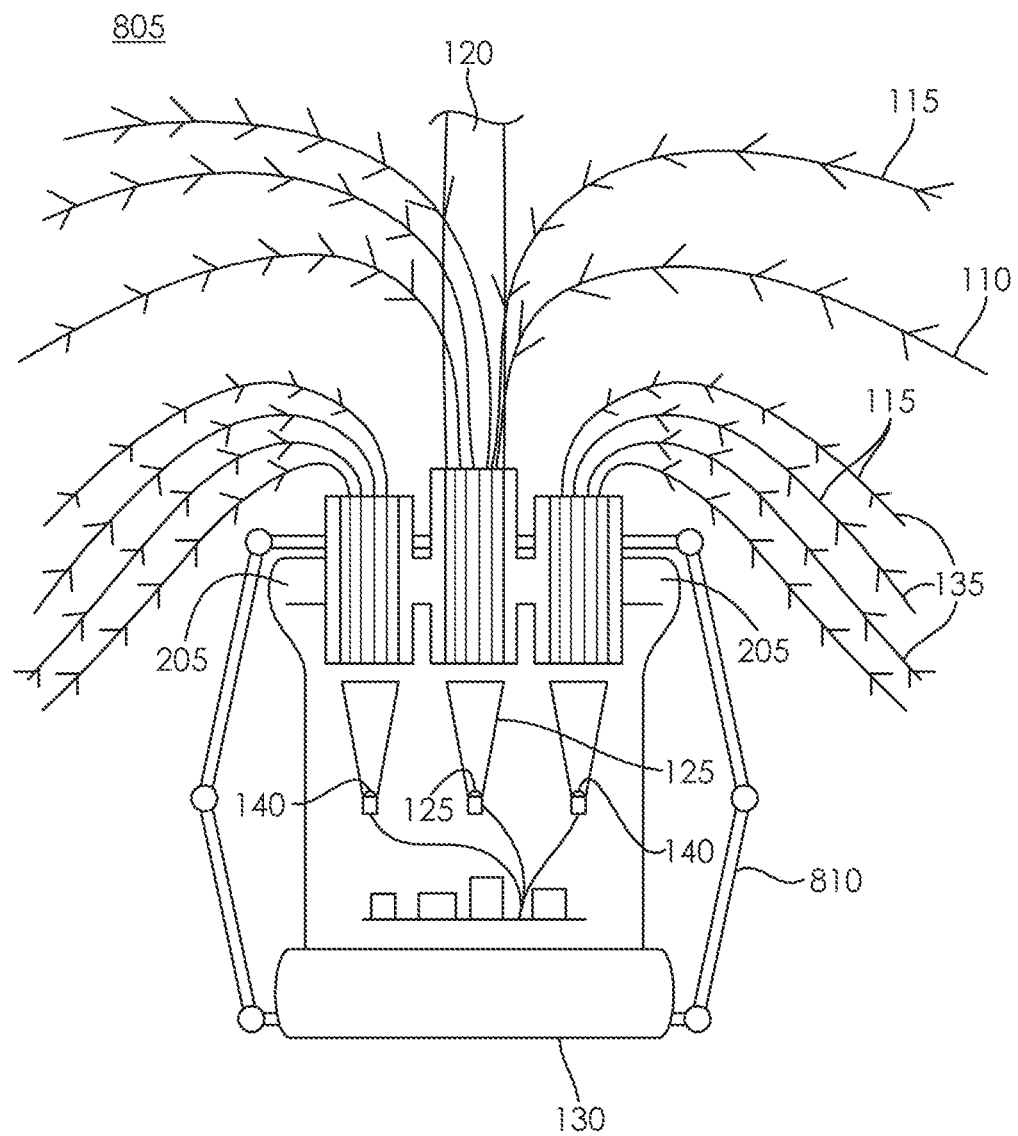
FIG. 8 depicts a side cross-sectional view of an exemplary fiber optic base configured without a color wheel.
Figure 9:
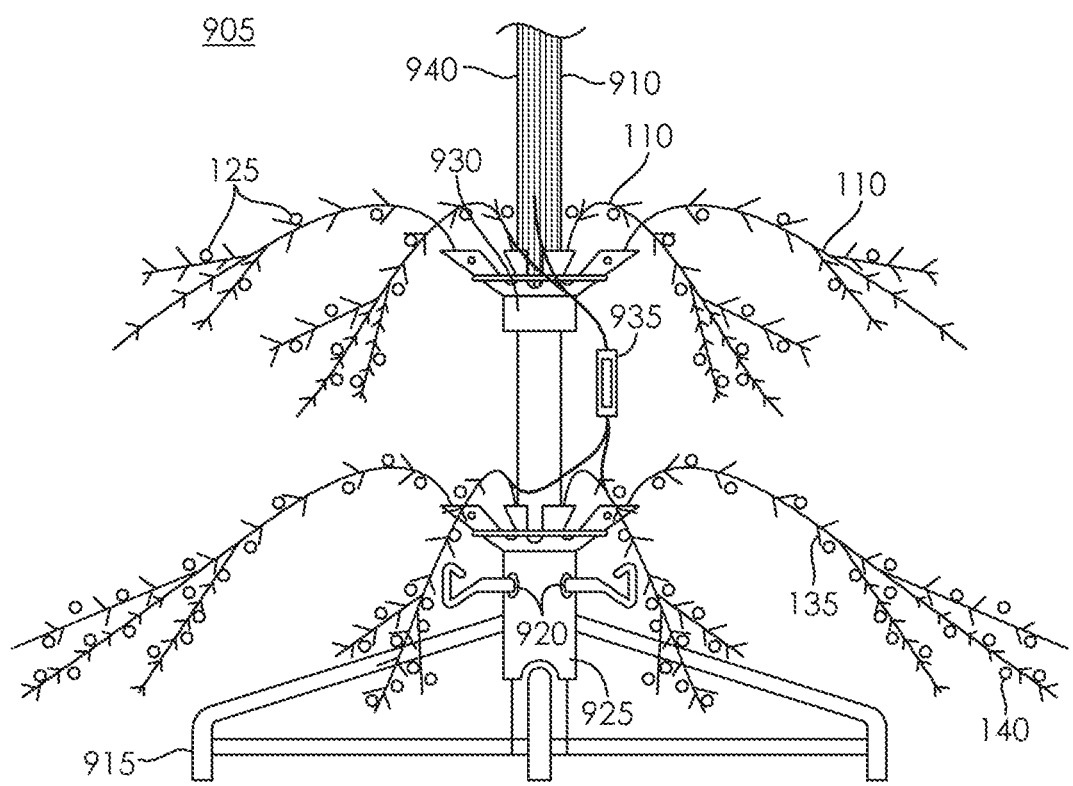
FIG. 9 depicts a side cross-sectional view of an exemplary artificial tree configured with a base adapted with added tree branch support.
Figure 10:
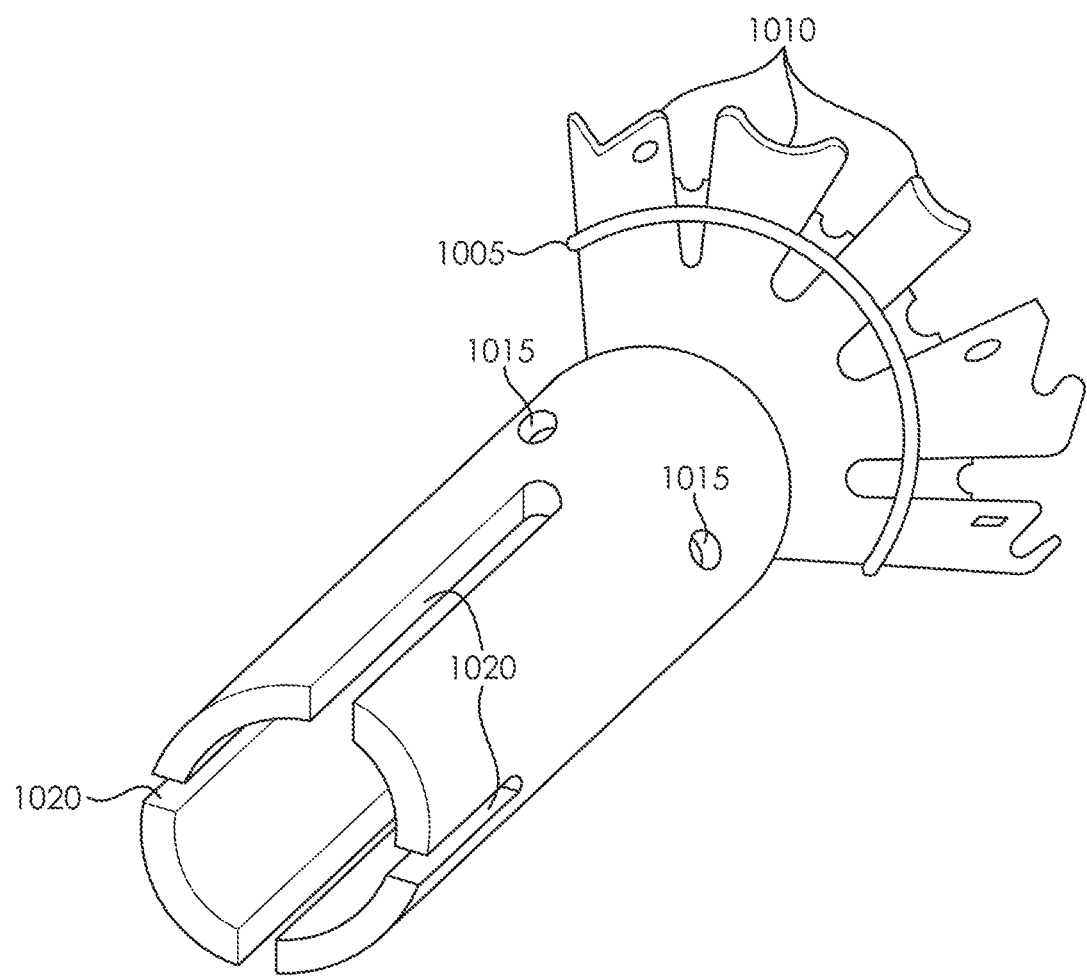
FIG. 10 depicts a perspective view of an exemplary tree stand branch support configured with slots adapted to fit over the stand arms.

To aid understanding, this document is organized as follows. First, illustrative designs of exemplary artificial trees including a base configured with openings configured to retain tree branches extending from the base and filling the space between the floor and the tree branches are briefly introduced with reference to FIG. 1. Second, with reference to FIGS. 2-7, the discussion turns to exemplary embodiments illustrating design of artificial trees including a color wheel. Specifically, embodiment fiber optic base and fiber optic bundle support designs for artificial trees employing a color wheel are disclosed. Finally, with reference to FIGS. 8-10, illustrative base designs of exemplary artificial trees without a color wheel are described.

Figure 1:
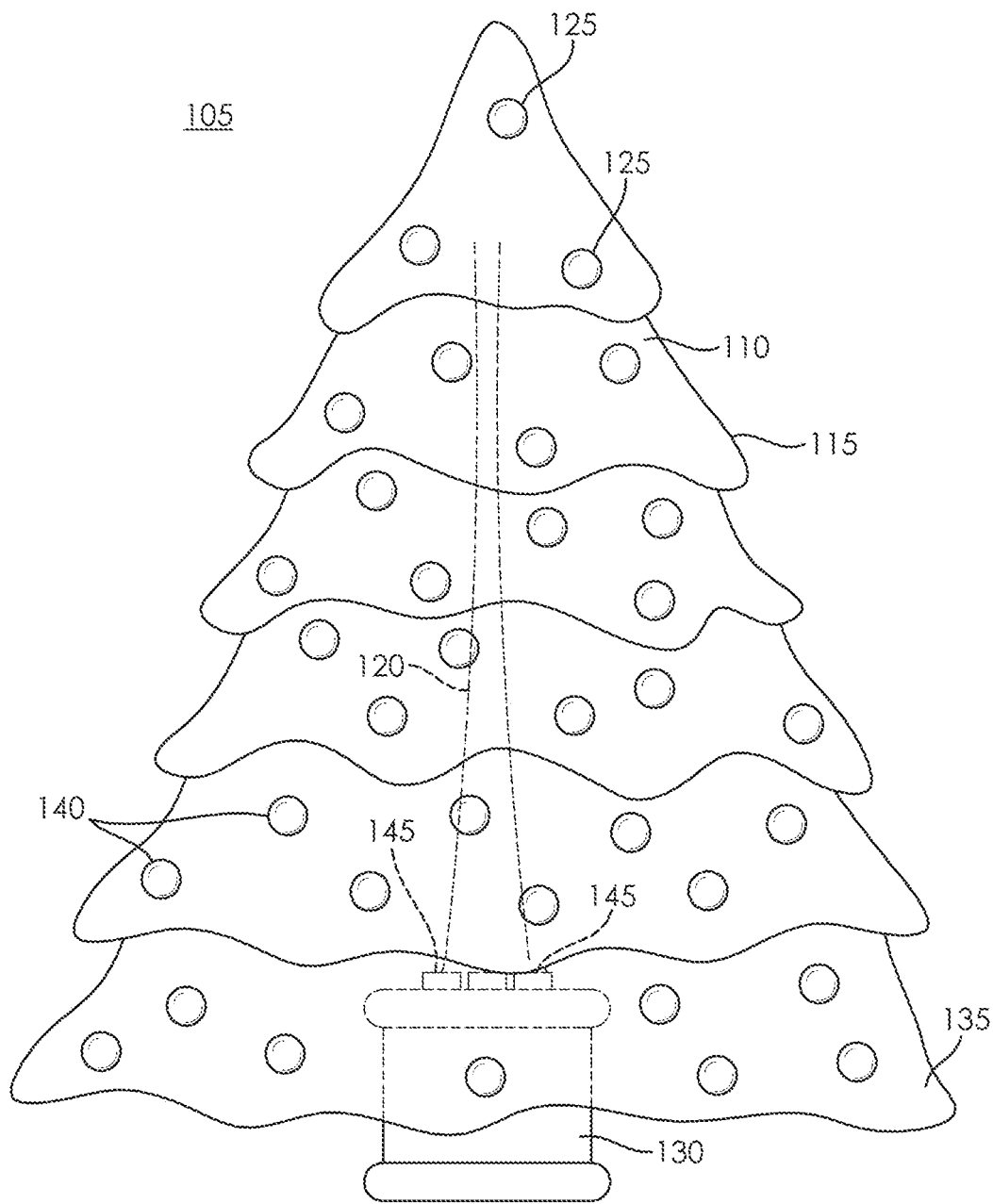
FIG. 1 depicts an exemplary artificial tree including a trunk with first tree branches extending from the top of the trunk to above the floor, a base configured with apertures adapted to retain second tree branches extending from the base and covering the space between the floor and the first branches, and a light source configured to illuminate the first and second branches.

FIG. 1 depicts an exemplary artificial tree including a trunk with first tree branches extending from the top of the trunk to above the floor, a base configured with apertures adapted to retain second tree branches extending from the base and covering the space between the floor and the first branches, and a light source configured to illuminate the first and second branches. In FIG. 1, the artificial tree 105 includes first branches 110 configured with fiber optics 115 adapted to illuminate the artificial tree 105. In the depicted embodiment, the first branches 110 are retained by and extend from the trunk 120. In the illustrated embodiment, the artificial tree 105 also includes the main LED lights 125 configured in the first branches 110 extending from the trunk 120. In the depicted embodiment, the artificial tree 105 trunk 120 is supported by the base 130 resting on a floor. In the depicted embodiment, the artificial tree 105 includes the add-on second branches 135 retained by and extending from the fiber optic base 130. In the illustrated embodiment the small add-on second branches 135 extend from the fiber optic base 130 to cover the fiber optic base 130 near the floor, providing the artificial tree 105 with a full-flow branch appearance. In the depicted embodiment, the add-on second branches 135 are configured with the add-on LED lights 140 adapted to illuminate the add-on second branches 135 in the illustrated artificial tree 105 full-flow mode. In the illustrated embodiment, the small LED fiber optic bundles 145 extend from the fiber optic base 130 to illuminate the second branches 135 configured in the depicted artificial tree 105 full-flow add-on mode. Various embodiments may include a "Full-flow" of added Fiber Optics and Branches that may be added to a Fiber Optic tree covering the fiber optic base 130.

Figure 2:
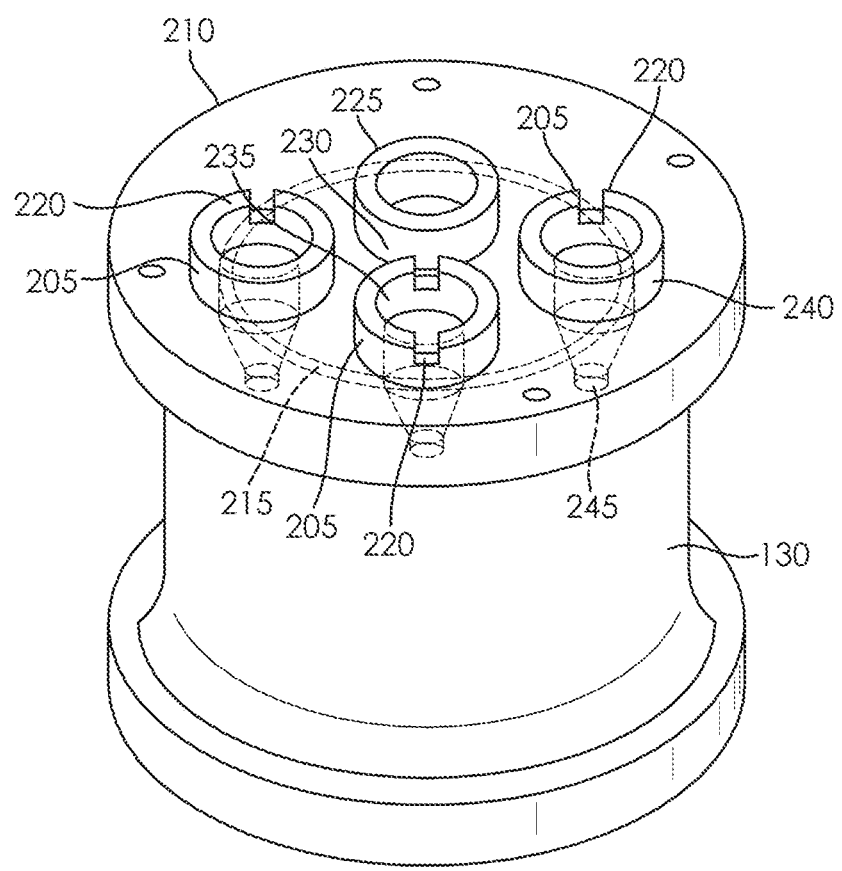
FIG. 2 depicts a side perspective view of an exemplary fiber optic base configured with apertures adapted to retain fiber optic tubes and branches in a base design including a color wheel.

FIG. 2 depicts a side perspective view of an exemplary fiber optic base configured with apertures adapted to retain fiber optic tubes and branches in a base design including a color wheel. In FIG. 2, the depicted embodiment full-flow fiber optic base 130 includes the fiber optic tubes 205 configured as apertures opening through the fiber optic top 210. The illustrated embodiment full-flow fiber optic base 130 includes the color wheel 215 configured to change the color of light illuminating a tree supported by the fiber optic base 130. In the depicted embodiment, the illustrated fiber optic base 130 fiber optic tubes 205 include support notches 220 configured to support fiber optic bundles extending through the fiber optic tubes 205. The illustrated embodiment fiber optic base 130 includes the fiber optic tree trunk tube 225 configured with an aperture to extend fiber optic bundles from the fiber optic base 130 to illuminate branches of a tree supported by the fiber optic base 130. The depicted embodiment fiber optic base 130 LED reflector 230 is configured to reflect light from the LED light 235 through the fiber optic tube 205. The illustrated embodiment fiber optic base 130 small LED reflector 240 is configured to reflect light from the small LED light 245 through the fiber optic tube 205. Various embodiments may include a fiber optic base 130 with 3 smaller openings (tubes) with LED's/Lights below the color wheel and a supporting notch for the smaller fiber optic bundles that may be added. In some embodiments, illumination below the color wheel may be provided by LED. In an illustrative example, various embodiment implementations may provide illumination below the color wheel with an LED or other light bulb types. For example, in various embodiments, the illumination below the color wheel may be provided by Halogen light bulbs, or other light bulb type, configured to illuminate the optical fibers for the trunk branches.

Figure 3:
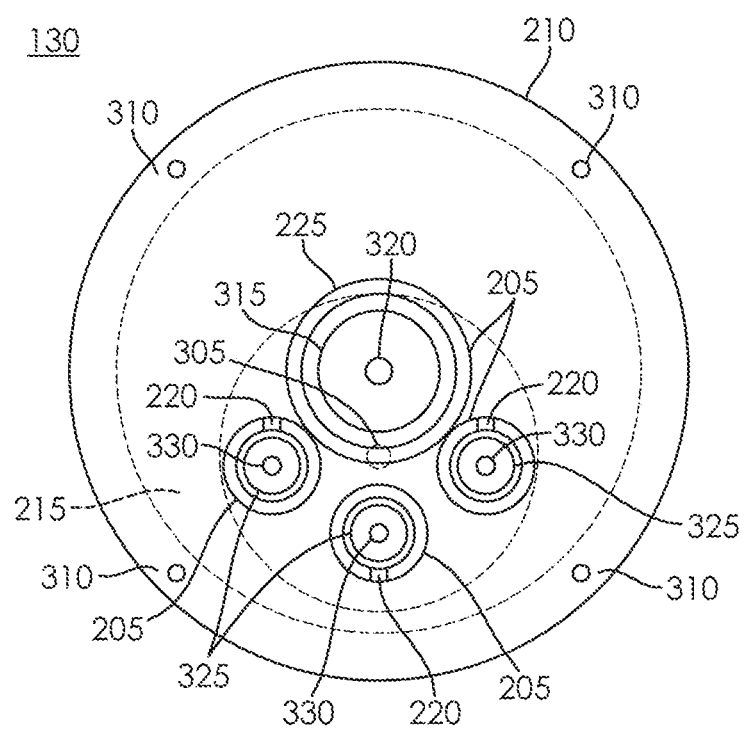
FIG. 3 depicts a top view of an exemplary fiber optic base configured with apertures adapted to retain fiber optic tubes and branches in a base design including a color wheel.

FIG. 3 depicts a top view of an exemplary fiber optic base configured with apertures adapted to retain fiber optic tubes and branches in a base design including a color wheel. In FIG. 3, the depicted embodiment fiber optic base 130 includes the motor shaft 305 configured to rotate the color wheel 215 to change the color of light illuminating a tree supported by the fiber optic base 130. In the illustrated embodiment, the fiber optic top 210 is secured to the fiber optic base 130 by the securing screw 310. The illustrated embodiment fiber optic base 130 includes the fiber optic tubes 205 configured with apertures opening through the fiber optic top 210. In the depicted embodiment, the illustrated fiber optic base 130 fiber optic tubes 205 include support notches 220 configured to support fiber optic bundles extending through the fiber optic tubes 205. The illustrated embodiment fiber optic base 130 includes the fiber optic tree trunk tube 225 configured with an aperture to extend fiber optic bundles from the fiber optic base 130 to illuminate branches of a tree supported by the fiber optic base 130. In the depicted embodiment, the fiber optic tree trunk tube 225 includes the LED lens reflector 315 configured to reflect light from the LED light 320 through the fiber optic tree trunk tube 225. The illustrated embodiment fiber optic base 130 small lens reflector 325 is configured to reflect light from the small LED light 330 through the fiber optic tube 205. Various embodiments may include a fiber optic base with 3 smaller openings (tubes) with LED's/Lights below the color wheel and a supporting notch for the smaller fiber optic bundles that may be added. In some embodiments, illumination below the color wheel may be provided by LED. In an illustrative example, various embodiment implementations may provide illumination below the color wheel with an LED or other light bulb types. For example, in various embodiments, the illumination below the color wheel may be provided by Halogen light bulbs, or other light bulb type, configured to illuminate the optical fibers for the trunk branches.

Figure 4:
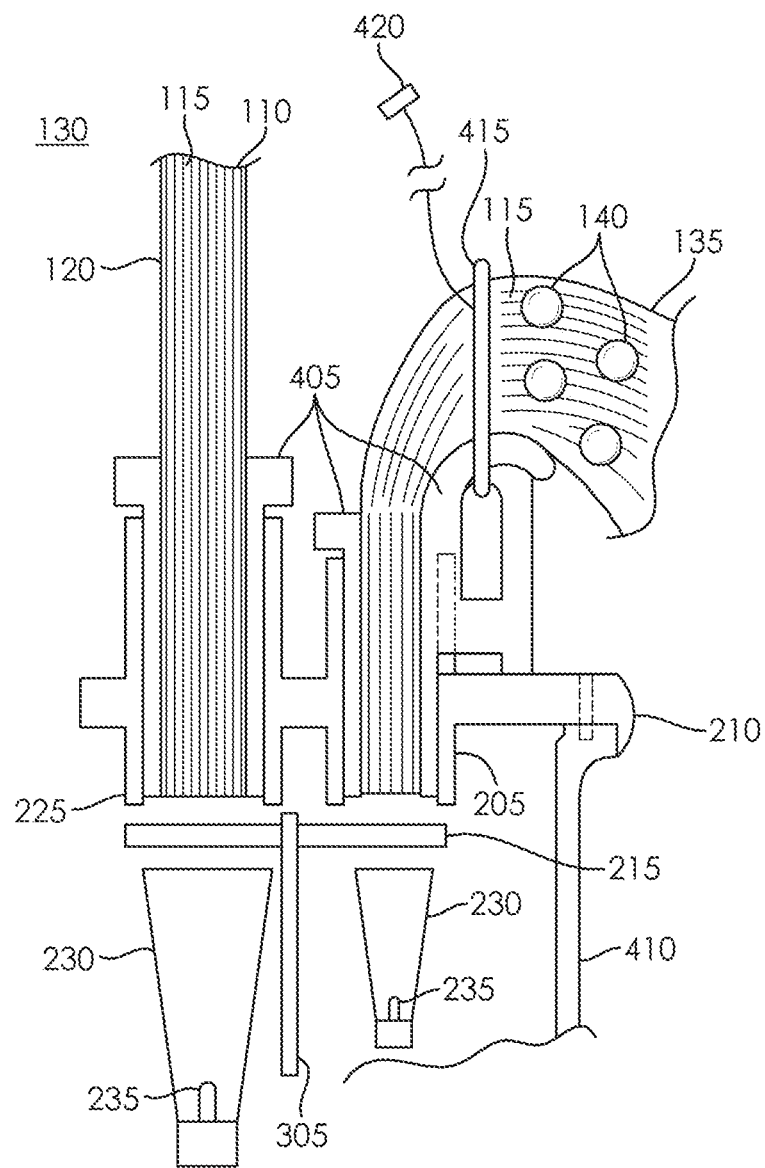
FIG. 4 depicts a cross-sectional view of an exemplary fiber optic base configured with a color wheel.

FIG. 4 depicts a cross-sectional view of an exemplary fiber optic base configured with a color wheel. In FIG. 4, the depicted embodiment fiber optic base 130 supports the artificial tree trunk 120 retaining the first branches 110 and the fiber optics 115 adapted to illuminate the first branches 110 retained by and extending from the trunk 120. In the illustrated embodiment, the fiber optic base 130 includes the fiber optic supports 405 adapted to mechanically support the fiber optics 115 extending from the fiber optic tube 205 and the fiber optic tree trunk tube 225 through the fiber optic top 210. In the depicted embodiment, the color wheel 215 is rotatably engaged with the motor shaft 305 to change the color of light illuminating a tree supported by the fiber optic base 130. The illustrated embodiment fiber optic base 130 LED reflectors 230 are configured to reflect light from the LED lights 235 through the fiber optic tube 205 and the fiber optic tree trunk tube 225 to illuminate via the fiber optics 115 the first branches 110 retained by and extending from the trunk 120 and the add-on second branches 135 retained by and extending from the fiber optic base 130. In the depicted embodiment, the add-on LED lights 140 are configured to illuminate the add-on second branches 135 extending from the fiber optic base 130 through the fiber optic tube 205. In the illustrated embodiment, the fiber optics 115 configured in the add-on second branches 135 are mechanically retained with the add-on second branches 135 to the fiber optic base 130 body 410 by the securing strap 415. In the illustrated embodiment, the add-on second branches 135 include the connector to tree LED light strings 420 to operably couple the add-on branches with LED light strings arranged in the main tree. In various examples, an embodiment fiber optic base may retain a fiber optic tree in the center tube with a color wheel and illuminating LED light, with an added small fiber optic bundle with branches in the smaller tube, above the unused part of the color wheel and LED illuminating upward, with a support with securing strap and LED lights and leads to a connector to connect to tree LEDs. In some embodiments, illumination below the color wheel may be provided by LED. In an illustrative example, various embodiment implementations may provide illumination below the color wheel with an LED or other light bulb types. For example, in various embodiments, the illumination below the color wheel may be provided by Halogen light bulbs, or other light bulb type, configured to illuminate the optical fibers for the trunk branches.

Figure 5A:
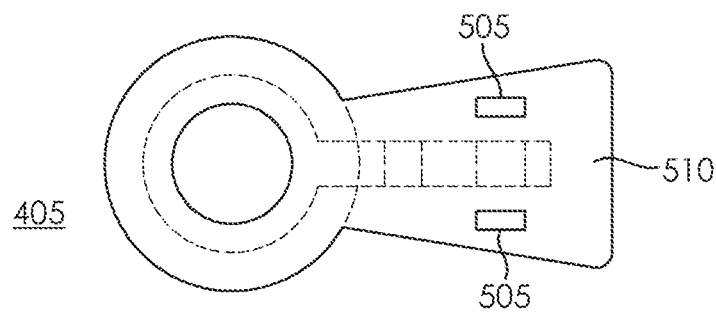
FIGS. 5A-5C depict various perspective views of an exemplary fiber optic bundle support design.
Figure 5B:
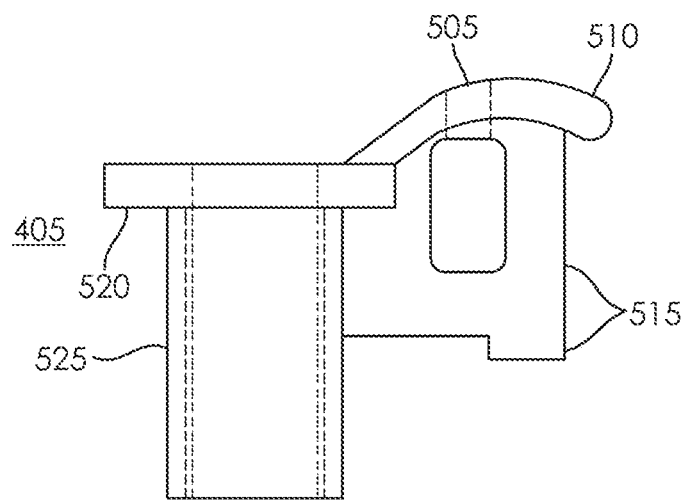
Figure 5C:
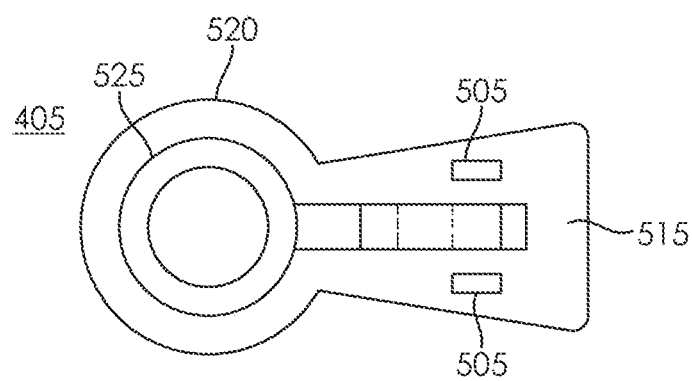

FIGS. 5A-5C depict various perspective views of an exemplary fiber optic bundle support design.

FIG. 5A depicts a top view of an exemplary fiber optic bundle support. In FIG. 5A, the exemplary fiber optic bundle support 405 includes the securing strap holes 505 configured along the branch support 510 upper surface.

FIG. 5B depicts a side view of an exemplary fiber optic bundle support. In FIG. 5B, the exemplary fiber optic bundle support 405 includes the securing strap holes 505 configured along the branch support 510 upper surface. The depicted embodiment fiber optic bundle support 405 includes the branch weight support 515. In the illustrated embodiment, the fiber optic bundle support 405 includes the tube insertion top 520 configured at the upper end of the support tube 525.

FIG. 5C depicts a bottom view of an exemplary fiber optic bundle support. In FIG. 5C, the exemplary fiber optic bundle support 405 includes the securing strap holes 505 configured in the branch weight support 515 lower surface. In the depicted embodiment, the fiber optic bundle support 405 includes the tube insertion top 520 lower surface configured in the support tube 525 upper end.

Figure 6:
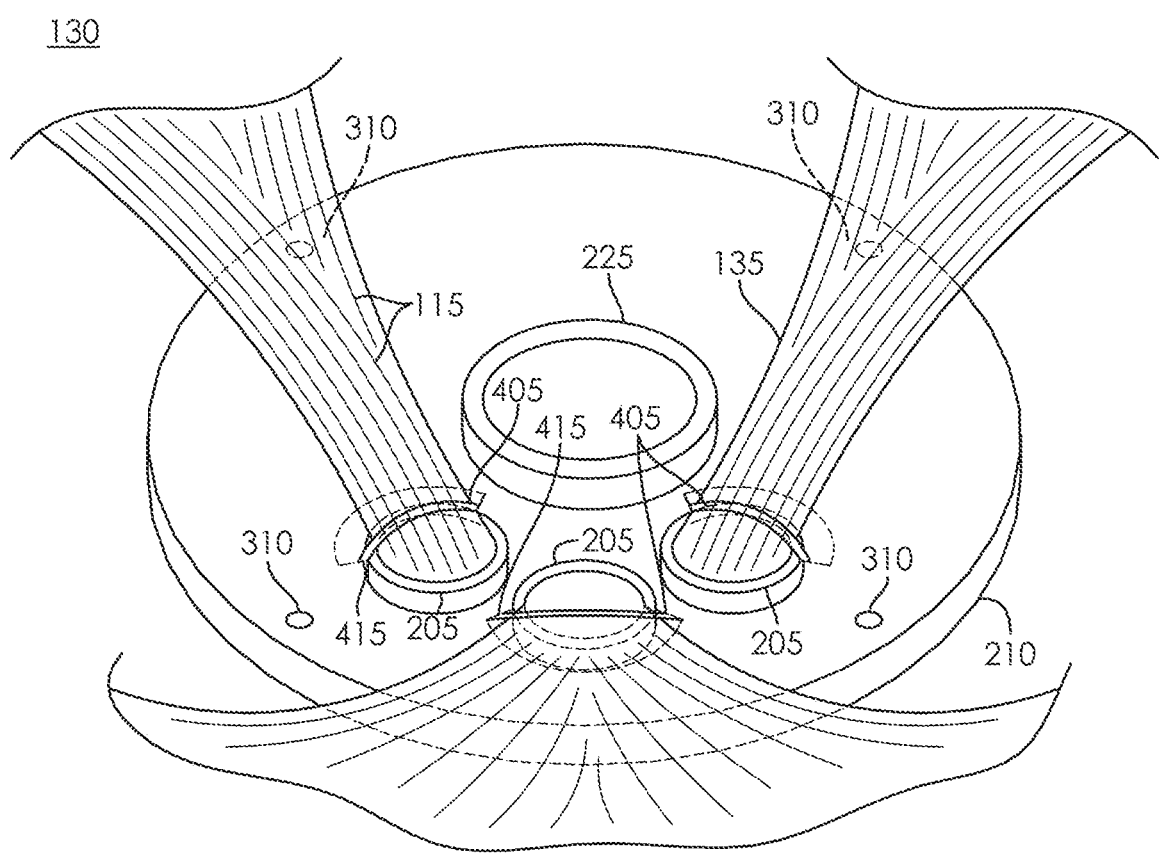
FIG. 6 depicts a top view of an exemplary fiber optic base configured with apertures adapted to retain fiber optic bundles exiting the apertures.

FIG. 6 depicts a top view of an exemplary fiber optic base configured with apertures adapted to retain fiber optic bundles exiting the apertures. In FIG. 6, the illustrated embodiment fiber optic base 130 includes the fiber optics 115 and the add-on full-flow branches 135 extending through the fiber optic top 210 via the fiber optic tubes 205. In the depicted embodiment, the fiber optic tree trunk tube 225 is illustrated in an open unconfigured mode without fiber optics extending from the fiber optic tree trunk tube 225 aperture. In the illustrated embodiment, the fiber optics 115 and the add-on full-flow branches 135 are retained by the fiber optic bundle support 405 and securing strap 415. In the depicted embodiment, the securing screws 310 mechanically engage the fiber optic top 210 with the fiber optic base 130. Various embodiment fiber optic base designs may include three individual small fiber optic bundles and branches exiting their openings.

Figure 7:
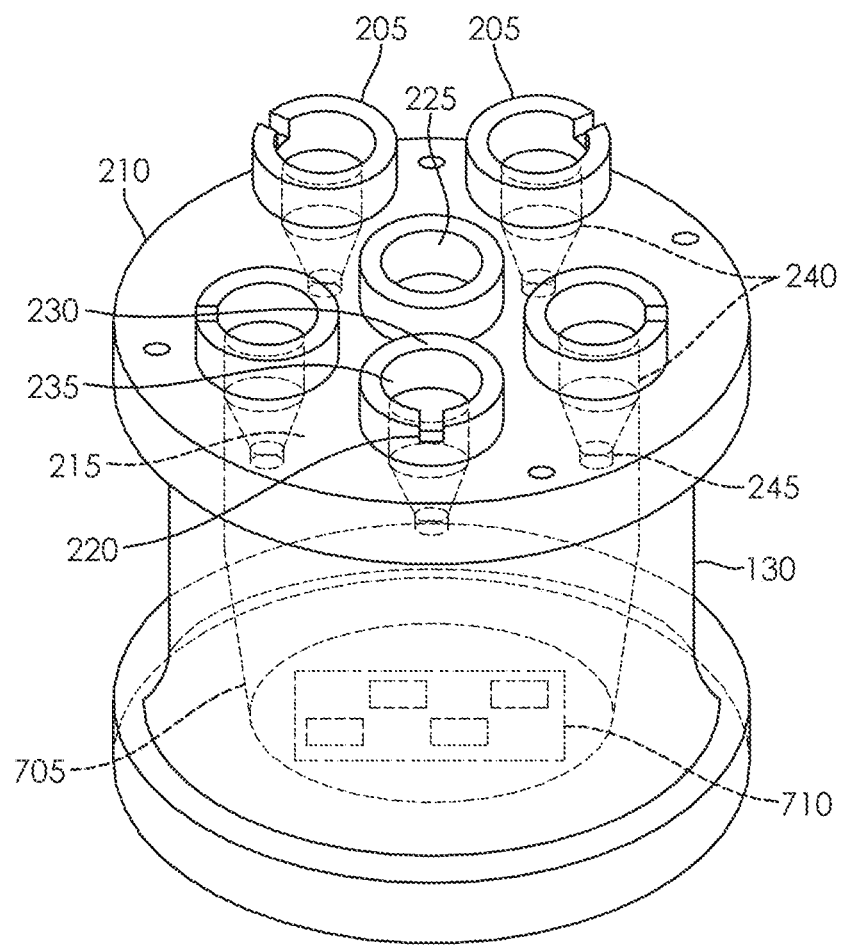
FIG. 7 depicts a side perspective view of an exemplary fiber optic base configured with apertures adapted to retain fiber optic tubes and branches in an electronic base design adjusted for a configuration without a color wheel.

FIG. 7 depicts a side perspective view of an exemplary fiber optic base configured with apertures adapted to retain fiber optic tubes and branches in an electronic base design adjusted for a configuration without a color wheel. In FIG. 7, the embodiment full-flow fiber optic base 130 includes the fiber optic tube 205 and fiber optic tree trunk tube 225 apertures configured in the fiber optic top 210 to permit fiber optic bundles to be retained by and extend from the full-flow fiber optic base 130. In the illustrated embodiment, each fiber optic tube 205 includes support notch 220 adapted to mechanically support a fiber optic bundle extending from the full-flow fiber optic base 130 via any fiber optic tube 205 aperture configured in the fiber optic top 210. The depicted embodiment fiber optic base 130 LED reflector 230 is configured to reflect light from the LED light 235 through the fiber optic tube 205. The illustrated embodiment fiber optic base 130 small LED reflector 240 is configured to reflect light from the small LED light 245 through the fiber optic tube 205. The illustrated embodiment full-flow fiber optic base 130 includes the color wheel 215 configured to change the color of light illuminating a tree retained by the fiber optic base 130. In the depicted embodiment, the full-flow fiber optic base 130 includes the LED leads 705 operably coupling each LED light 235 and small LED light 245 with electrical control 710. Various embodiment fiber optic designs may be configured without a color wheel, with multiple smaller openings with multicolor changing LEDs below the openings to illuminate added "Full Flow" bundles and branches.

FIG. 8 depicts a side cross-sectional view of an exemplary fiber optic base configured without a color wheel. In FIG. 8, the exemplary full-flow fiber optic wreath-style all-electronic addon 805 includes the fiber optic base 130 configured with fiber optics 115 extending through the fiber optic tube 205 and fiber optic tree trunk tube 225 apertures. In the depicted embodiment, the trunk 120 is retained by the fiber optic tree trunk tube 225 aperture. In the illustrated embodiment, the first branches 110 extend from the trunk 120. In the depicted embodiment, the first branches 110 are configured with fiber optics 115. In the illustrated embodiment, the add-on second branches 135 extend from the fiber optic base 130 through the fiber optic tube 205 apertures to cover the fiber optic base 130 near the floor. The depicted embodiment full-flow fiber optic wreath-style all-electronic addon 805 also includes the wreath-style structure configured in the fiber optic base 130. In the illustrated embodiment, the fiber optic base 130 includes the multicolor changing LED lights 125 configured to illuminate the first branches 110. In the depicted embodiment, the fiber optic base 130 also includes the small multicolor changing LED lights 140 configured to illuminate the second branches 135. Various embodiment fiber optic base designs may have a color wheel but have multiple added smaller openings and multicolor LEDs to illuminate added fiber optic bundles and branches.

FIG. 9 depicts a side cross-sectional view of an exemplary artificial tree configured with a base adapted with added tree branch support. In FIG. 9, the exemplary artificial tree 905 includes the branches 110 extending from the tree pole 910 retained in the tree stand 915 by the tree to stand securing bolts 920. In the depicted embodiment, the tree stand 915 includes the full-flow added branch support 925 configured to fit over the tree stand 915 to support the branches 135 extending from the tree stand 915. In the illustrated embodiment, the artificial tree 905 includes the branch support 930 configured with the tree pole 910 and the tree stand 915. The depicted embodiment artificial tree 905 includes the connectors 935 adapted to operably couple the multicolor changing LED light emitters 125 configured in the branches 110 with power supplied to the branches 135. In the illustrated embodiment, the branches 135 are configured with the multicolor changing LED light emitters 140 operably coupled with power through the tree pole 910 by the light/LED wiring 940. Various embodiment artificial tree designs may include a tree stand mount providing added tree branch support with its branches and LED/lights and interconnection to the tree wiring.

FIG. 10 depicts a perspective view of an exemplary tree stand branch support configured with slots adapted to fit over the stand arms. In FIG. 10, the branch support 930 includes the reinforcing ring 1005 mechanically supporting the tree branch securing arms 1010 configured to retain artificial tree branches. The depicted embodiment branch support 930 is configured for secure retention in a tree stand by the tree stand securing bolt holes 1015 and the tree stand slots 1020. Various embodiment tree stand designs may include branch support mounts with slots to fit over the tree stand arms and holes for the bolts securing the tree stand to the tree.

Although various embodiments have been described with reference to the Figures, other embodiments are possible. For example, in various scenarios exemplary of prior art Christmas trees, fiber Optic and standard artificial trees often do not have branches that reach the floor, leaving a gap from the branches to the floor and exposing the stand, or more particularly, the base, of a fiber Optic tree. Additionally, some prior art fiber Optic trees utilize a color wheel to cause the colors in the fibers to change, however the color wheel may be offset, because the fiber optic tree trunk is in the center of the base and the light that shines up thru the color wheel is also directly below the trunk. In an example illustrative of some prior art trees, such an offset color wheel may have significant unused area that could be utilized to illuminate more optical fibers, if there were added light sources below more of the color wheel. In some examples illustrative of prior art artificial tree designs, the space from the tree's lower branches to the floor may be exposed, showing the tree stand; often "tree skirts" are added to cover up the unsightly tree stand.

Various embodiments of the present invention correct each of the aforementioned deficiencies. First, in some embodiment Fiber Optic tree implementations, the base is modified with 3 or more added openings (tubes) for fiber optics, with branches to be inserted and spread out to cover the base and filling up the space from the tree branches down close to the floor. In various embodiment designs, illumination sources are added below the openings, shining thru the areas of the color wheel that may have been unused by prior art implementations. Some embodiments include supports configured to hold the fiber optics and additional branches in the tubes, to support the branches and optical fibers firm, and prevent the added off-center load from pulling out of the openings (tubes). Some embodiments of the present invention provide an extra row of branches mounted on the tree stand to cover up that space from the tree's lower branches to the floor, providing for a "Full flow" tree appearance. In various embodiment implementations, lights and LEDs may also be configured in the added branches and interconnected with a connector to the tree's lights and LEDs. In an illustrative example, for those Fiber Optic trees that use Multiple Color LEDs to illuminate the fiber Optics of the tree thru the trunk, added openings around the top of the base may also have smaller fiber optic bundles and multicolor LEDs below them to illuminate the added fiber Optic bundles that hang over the sides of the base to fill the distance from the tree fiber optics close to the floor, giving the appearance of a "Full Flowing" fiber optic tree.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, except where otherwise noted, or where the context excludes that possibility.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus for an artificial tree configured to cover the space above a floor on which the artificial tree rests, comprising:
    a trunk with first tree branches extending from the trunk to above a floor on which the tree rests;
    a base supporting the trunk and configured with apertures adapted to retain second tree branches extending from the base and covering the space between the floor and the first branches;
    a light source configured to illuminate the first and second branches; and
    a support disposed on the base;
    wherein the support is configured to bend at least one of the second tree branches away from the trunk.

2. The apparatus of claim 1, wherein the apparatus further comprises the first tree branches extending substantially from the trunk to a plane substantially parallel with and above a floor on which the tree rests, the plane and the floor defining a space between the floor and the first tree branches.

3. The apparatus of claim 1, further comprising optic fiber optically coupling the light source to the first tree branches and second tree branches.

4. The apparatus of claim 3, wherein the base includes a tube disposed in a base top and configured to mechanically support optic fiber passing through the tube in the base top.

5. The apparatus of claim 1, wherein at least one of the apertures disposed in the base is configured to mechanically support a branch retained by the base.

6. The apparatus of claim 1, wherein the base includes a tube disposed in a base top, the tube configured to mechanically support the trunk retained by the base top.

7. The apparatus of claim 1, further comprising a color wheel.

8. The apparatus of claim 1, wherein the second branches substantially cover the space between the first branches and the floor.

9. An apparatus for an artificial tree configured to cover the space above a floor on which the artificial tree rests, comprising:
    a trunk including a substantially cylindrical elongated structure having a first trunk end and a second trunk end disposed opposite the first trunk end along the longitudinal axis of the trunk;

first tree branches extending from a trunk section defined by the first trunk end and a point between the first trunk end and the second trunk end;
a base configured with apertures adapted to retain second tree branches extending from the base and covering the space between the floor and the first branches;
a first light emitter configured in the first branches;
a second light emitter configured in the second branches;
a light source configured in the base, the light source optically coupled with the first and second light emitters by optic fiber; and
a support member attached to a support disposed on the base;
wherein the support member bends at least one of the second tree branches away from the trunk.

10. The apparatus of claim 9, wherein the light source includes an LED.

11. The apparatus of claim 9, further comprising a color wheel and a motor configured to rotate the color wheel.

12. The apparatus of claim 9, wherein the base includes a tube disposed in a base top and configured to mechanically support optic fiber passing through the tube in the base top.

13. The apparatus of claim 9, wherein the base includes a securing strap adapted to mechanically secure a branch or optic fiber retained by the base.

14. The apparatus of claim 9, wherein the second branches substantially cover the space between the first branches and the floor.

15. An apparatus for an artificial tree configured to cover the space above a floor on which the artificial tree rests, comprising:
a trunk including a substantially cylindrical elongated structure having a first trunk end and a second trunk end disposed opposite the first trunk end along the longitudinal axis of the trunk;
first tree branches extending from a trunk section defined by the first trunk end and a point between the first trunk end and the second trunk end;
a base configured with apertures adapted to retain second tree branches extending from the base and covering the space between the floor and the first branches, the base configured with a tube disposed in a base top and adapted to mechanically support optic fiber passing through the tube in the base top, and, at least one of the apertures being adapted to mechanically support a branch retained by the base;
a plurality of first light emitters configured in the first branches;
a plurality of second light emitters configured in the second branches;
an LED light source configured in the base, the LED light source optically coupled with the first and second light emitters by optic fiber; and
a strap attached to the base;
wherein the strap bends at least one of the second tree branches perpendicularly to the trunk.

16. The apparatus of claim 15, wherein the base includes an electronic control module operably coupled with the light source.

17. The apparatus of claim 15, wherein the base includes a tree stand including a tree branch securing arm.

18. The apparatus of claim 17, wherein the tree stand includes a reinforcing ring mechanically supporting the tree branch.

19. The apparatus of claim 1, wherein the support includes a branch weight support disposed at an upper portion of the support and a support member that is attached to the upper portion and configured to bend the at least one of the second tree branches perpendicularly to the trunk.

20. The apparatus of claim 9, wherein the support member is a strap.

* * * * *